Patented Nov. 7, 1944

2,361,965

UNITED STATES PATENT OFFICE 2,361,965

LACTONES OF THE SATURATED AND UNSATURATED CYCLOPENTANOPOLY-HYDROPHENANTHRENE SERIES AND PROCESS OF PREPARING SAME

Leopold Ruzicka, Zurich, and Tadeus Reichstein, Basel, Switzerland, assignors to Ciba Pharmaceutical Products, Incorporated, Summit, N. J., a corporation of New Jersey No Drawing. Application August 27, 1941, Serial No. 408,550. In Switzerland September 15, 1938

26 Claims. (Cl. 260—239.5)

The aglycones of most vegetable cardiac poisons are derivatives of the cyclopentanopolyhydrophenanthrene-series which are characterised by an unsaturated vinyl-acetic acid-lactone group as a side chain in 17-position as indicated for example in the following formula

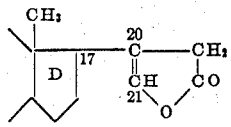

Hitherto no synthetic method for making derivatives of the cyclopentanopolyhydrophenanthrene series having such characteristic lactone-groups have been described. On account of their therapeutically valuable properties a suitable synthesis of these vegetable cardiac poisons has become of great importance.

This invention relates to the manufacture of lactones of the saturated and unsaturated cyclopentanopolyhydrophenanthrene-series by condensing a compound of the said series having in 17-position the radical $$-CO-CH_2-R$$

in which R stands for an esterified or etherified hydroxyl group with a functional derivative of a halogen fatty acid such as an α- or β-halogenated fatty acid ester, amide or nitrile and if desired subjecting the condensation product to a re-esterifying treatment and/or a treatment for splitting off water.

The following schema indicates the probable course of the reaction:

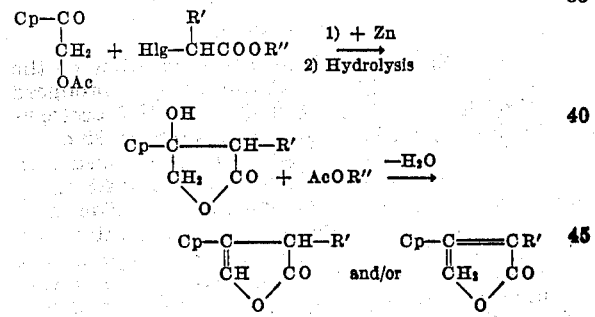

(Cp is any substituted cyclopentanopolyhydrophenanthrene-residue, R'=H or alkyl, R" is alkyl.)

The condensation may be effected in known manner by means of zinc or magnesium in a suitable inert solvent, for instance benzene, toluene or ether. Lactonisation generally occurs during the condensation and also frequently a partial elimination of water. When lactonisation takes place only with difficulty a treatment with re-esterifying or hydrolysing and lactonising agents may be advantageous. In many instances one obtains mixtures which may be separated into their constituents or further worked up as mixtures. Thus if desired the condensation product may be subjected to the known processes for eliminating water, of which distillation or sublimation under diminished pressure has proved especially useful, if desired after admixture with surface-active substances, for instance aluminium oxide, silica gel, active carbon, fuller's earth or with an anhydrous salt, for instance copper sulfate. The mixture produced of α.β- and β.γ-unsaturated lactones may be treated for isolating pure components in the usual manner, for instance by fractional crystallisation or by chromatographic adsorption analysis. The presence of a β.γ-unsaturated lactone may easily be detected positively by the color reaction with sodium nitro-prusside and some alkali in pyridine solution (Legal test).

As parent materials there come into question the cyclopentanopolyhydrophenanthrene-derivatives which have the ketol side chain in 17-position, preferably those of the pregnane-, allopregnane- and pregnene-series, for instance 3:21-diacetoxy-pregnanone- (20), 3:21-diacetoxy-allopregnanone-(20) and Δ⁵-3:21-diacetoxy-pregnenone- (20).

The following examples illustrate the invention but are not to be regarded as limiting it in any way:

*Example 1*

600 mgms. of 3:21-diacetoxy-allopregnanone-(20) of melting point 153–154° C. and of the formula

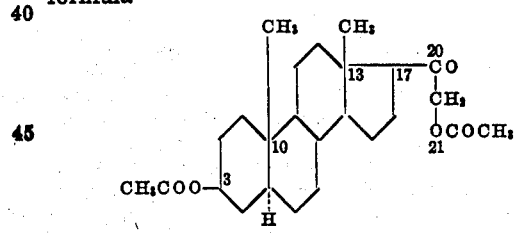

are dissolved in 5 cc. of absolute benzene and the solution is caused to react with 300 mgms. of ethylbromacetate and 120 mgms. of zinc. After heating on the water-bath for 2 hours the mass is decomposed with ice and dilute hydrochloric acid and the product dissolved in ether.

The ethereal solution is washed with water and dilute bicarbonate solution and dried over anhydrous sodium sulfate and then evaporated. The residue is mixed with 6 grams of aluminium oxide and heated at 180° C. in a sublimation vessel under a pressure of 0.01 mm. until no further sublimate is produced. The sublimate is adsorbed in benzene solution on aluminium oxide and subdivided into a number of fractions by fractional elutriation by means of benzene, ether and acetone. The various fractions are tested by the Legal test and those which give a positive colour reaction are separated from the rest. By fractional crystallisation from a mixture of ethylacetate and hexane the individual fractions can be further purified.

*Example 2*

2 grams of $\Delta^5$-3:21-diacetoxy-pregnen-20-one of melting point 170° C. are dissolved in 20 cc. of absolute benzene, the solution is mixed with 1.56 grams of zinc spangles and 4.24 grams of freshly distilled ethylbromacetate and the whole is boiled under reflux until the zinc has almost completely dissolved. The benzene solution is cautiously evaporated and the residue is mixed with absolute ethyl alcohol and the solution filtered from the zinc mud. The alcoholic solution is poured into ice-cold dilute hydrochloric acid and the precipitate is dissolved in ether. The alcoholic ether layer is washed with much water, whereby the main quantity of the product is separated in the form of a white powder which is filtered. This product is relatively sparingly soluble in ether but can be purified by crystallisation from glacial acetic acid and absolute alcohol. It then melts at 239° C. and is $\Delta^5$-3-acetoxy-20:21-dihydroxy-norcholenic acid-lactone of the formula

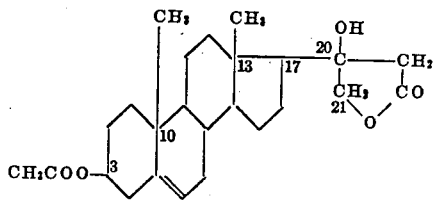

The elimination of water to produce the corresponding unsaturated lactone may be effected by heating at 240° C. in a vacuum. The reaction is similar when other halogen fatty acid esters are used, for instance ethyl-α- or -β-bromopropionate.

Instead of from 10:13-dimethyl-cyclopentanopolyhydrophenanthrene compounds one may also start from cyclopentanopolyhydrophenanthrene compounds containing no methyl group or only one methyl group, for instance in 13-position.

*Example 3*

1 gram $\Delta^5$-3:21-diacetoxy-pregnene-20-one and 1 gram of zinc spangles are dried in a high vacuum. 20 cc. of absolute dioxane are added to the mixture whereupon 2.1 grams of bromoacetic ester are allowed to run in. The whole is cautiously heated until the reaction starts, whereupon boiling is continued for 10 minutes under reflux. After cooling 30 cc. of absolute ethyl alcohol are added, the solution is filtered from zinc, and ether and dilute hydrochloric acid are added to the reaction mixture. The aqueous layer is extracted three times with ether, the united ether solutions are washed with dilute hydrochloric acid and water and dried over sodium sulfate. After evaporating the ether the residue is dissolved in some ether and acetone and adsorbed to a column of 10 grams of aluminium oxide. The solution is washed with hexane and benzene, nothing being elutriated. With acetone-methanol a crystallized substance may be dissolved from the column which substance, for further purification, is again chromatographed and then repeatedly recrystallized from acetone. The lactone of $\Delta^{5:6;20:22}$-3:21-dioxy-nor-choladienic acid has the melting point 250–260° C. and the following formula

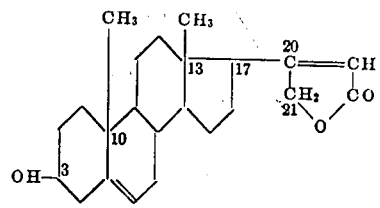

*Example 4*

4 grams of $\Delta^5$-3:21-diacetoxy-pregnene-20-one and 6 grams of zinc spangles are dried in a high vacuum. 40 cc. of absolute benzene are added to the mixture and then in one portion 9 grams of bromoacetic ester. The reaction mixture is cautiously heated, a rather violent reaction occurring after a short time, which lasts about 10 minutes. The mixture is then further heated for ½ hour under reflux, 2 cc. of absolute alcohol are added and boiling is continued for 1 hour on the water-bath. 30 cc. of the solution are then distilled, the remaining content of the flask is dissolved in 80 cc. of absolute alcohol and filtered from residue of zinc. The clear filtrate is concentrated in a vacuum to about 40 cc. and mixed in a separating funnel with ether and dilute hydrochloric acid. After shaking for a short time a yellow precipitate separated from the ether solution in the form of rather coarse granules. This is filtered, washed with ether until the yellow color disappears, and then with dilute hydrochloric acid and water and finally dried in a vacuum. This reaction product is heated with acetanhydride in pyridine for 2 hours to 60° C. The solution is evaporated and the residue chromatographed by using a column of 60 grams of aluminium oxide prepared with benzene. By the extraction with ether there is obtained the lactone of the $\Delta^{5:6;20:22}$-3-acetoxy-21-oxy-nor-choladienic acid melting at 170–172° C. The lactone of the $\Delta^{5:6}$-3-acetoxy-20:21-dioxy-nor-cholenic acid described in Example 2 may be subsequently obtained with acetone.

*Example 5*

3.0 grams of the triphenylmethylether of the $\Delta^5$-3-acetoxy-pregnene-20-one-21-ol, produced according to usual methods from $\Delta^5$-3-acetoxy-pregnene-20-one-21-ol, are dissolved in 30 cc. of absolute benzene and the solution is mixed with 2.0 grams of pulverized zinc-copper and 4.5 grams of freshly distilled bromoacetic ester. The reaction is aided by boiling in a reflux apparatus until the majority of the zinc-copper is dissolved. The benzene is then cautiously evaporated in a vacuum, the residue is taken up in absolute alcohol and the undissolved material is separated by filtration. The alcoholic solution is heated for a short time with 5 cc. of concentrated hydrochloric acid, whereupon the reaction product is precipitated by addition of much water. After suction-filtering and washing with water the reaction product is aftertreated directly with acetic acid anhydride and pyridine. After evaporating the reagent in excess in a vacuum, the already described Δ⁵:⁶;²⁰:²²-3-acetoxy-21-oxy-nor-choladienic acid-lactone of melting point 174° C. is mainly obtained by recrystallization of the residue from alcohol. In addition there is also formed the lactone of the Δ⁵-3-acetoxy-20:21-dioxy-nor-cholenic acid of melting point 239° C.

Instead of the triphenylmethylether there may be used also other ethers, for instance methylether, ethylether or benzylether. If instead of the bromoacetic ester any other functional derivative of a halogen fatty acid is used, the condensation product may be treated with re-esterifying, hydrolysing and/or lactonising agents in known manner, instead, before or after the process for eliminating water.

This application is a continuation-in-part of our application Serial No. 295,696 filed September 19, 1939.

What we claim is:

1. A process for the manufacture of lactones of the saturated and unsaturated cyclopentanopolyhydrophenanthrene series, comprising treating a compound of the said series having in 17-position the radical

in which R stands for a member of the group consisting of an esterified and etherified hydroxyl group, with a member of the group consisting of α- and β-halogen fatty acid esters.

2. A process for the manufacture of lactones of the saturated and unsaturated cyclopentanopolyhydrophenanthrene series, comprising treating a compound of the said series having in 17-position the radical

in which R stands for an etherified hydroxyl group, with a member of the group consisting of α- and β-halogen fatty acid esters, amides and nitriles.

3. A process for the manufacture of lactones of the saturated and unsaturated 10:13-dimethyl-cyclopentanopolyhydrophenanthrene series, comprising treating a compound of the said series having in 17-position the radical

in which R stands for a member of the group consisting of an esterified and etherified hydroxyl group, with a member of the group consisting of α- and β- halogen fatty acid esters.

4. A process for the manufacture of lactones of the saturated and unsaturated 10:13-dimethyl-cyclopentanopolyhydrophenanthrene series, comprising treating a compound of the said series having in 17-position the radical

in which R stands for an etherified hydroxyl group, with a member of the group consisting of α- and β-halogen fatty acid esters, amides and nitriles.

5. A process for the manufacture of lactones of the saturated and unsaturated 10:13-dimethyl-cyclopentanopolyhydrophenanthrene-series, comprising treating a compound of the said series having in 17-position the radical

in which R stands for a member of the group consisting of an esterified and etherified hydroxyl group, with an ester of a member of the group consisting of α- and β-halogen fatty acids.

6. A process for the manufacture of lactones of the saturated and unsaturated 10:13-dimethyl-cyclopentanopolyhydrophenanthrene series, comprising treating a compound of the said series having in 17-position the radical

in which R stands for an etherified hydroxyl group, with an ester of a member of the group consisting of α- and β-halogen fatty acids.

7. A process for the manufacture of lactones of the saturated and unsaturated 10:13-dimethyl-cyclopentanopolyhydrophenanthrene series, comprising treating a compound of the said series having in 17-position the radical

in which R stands for a member of the group consisting of an esterified and etherified hydroxyl group, with ethylbromacetate.

8. A process for the manufacture of lactones of the saturated and unsaturated cyclopentanopolyhydrophenanthrene series, comprising treating a compound of the said series having in 17-position the radical

in which R stands for an etherified hydroxyl group, with ethylbromacetate.

9. A process for the manufacture of lactones of an unsaturated cyclopentanopolyhydrophenanthrene-series, comprising treating a Δ⁵-3:21-diacyloxy-pregnene-20-one with ethylbromacetate.

10. A process for the manufacture of a lactone of an unsaturated cyclopentanopolyhydrophenanthrene-series, comprising treating a Δ⁵-3:21-diacetoxy-pregnene-20-one with ethylbromacetate.

11. A process for the manufacture of lactones of the saturated and unsaturated cyclopentanopolyhydrophenanthrene-series, comprising treating a compound of the said series having in 17-position the radical

in which R stands for a member of the group consisting of an esterified and etherified hydroxyl group, with a member of the group consisting of α- and β-halogen fatty acid esters, amides and nitriles, and then subjecting the condensation product to a process for eliminating water.

12. A process for the manufacture of lactones of the saturated and unsaturated cyclopentanopolyhydrophenanthrene-series, comprising treating a compound of the said series having in 17-position the radical

in which R stands for a member of the group consisting of an esterified and etherified hydroxyl group, with a member of the group consisting of α- and β-halogen fatty acid esters, amides and nitriles, subjecting the condensation product to a process for eliminating water, and then to the action of re-esterifying agent.

13. A process for the manufacture of lactones of the saturated and unsaturated cyclopentanopolyhydrophenanthrene-series, comprising treating a compound of the said series having in 17-position the radical

in which R stands for a member of the group consisting of an esterified and etherified hydroxyl group, with a member of the group consisting of α- and β-halogen-fatty acid esters, amides and nitriles, and then subjecting the condensation product to the action of a re-esterifying agent.

14. A process for the manufacture of lactones of the saturated and unsaturated cyclopentanopolyhydrophenanthrene-series, comprising treating a compound of the said series having in 17-position the radical

—CO—CH₂—R in which R stands for a member of the group consisting of an esterified and etherified hydroxyl group, with a member of the group consisting of α- and β-halogen fatty acids, subjecting the condensation product to the action of a re-esterifying agent, and then to a process for eliminating water.

15. A member of the group consisting of the saturated and unsaturated cyclopentanopolyhydrophenanthrene compounds having in 17-position the grouping

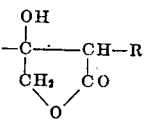

in which R is a member of the group consisting of hydrogen and an alkyl group.

16. A member of the group consisting of the saturated and unsaturated cyclopentanopolyhydrophenanthrene compounds having in 17-position the grouping

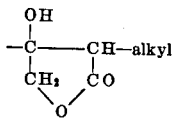

17. A member of the group consisting of the saturated and unsaturated 10:13-dimethyl-cyclopentanopolyhydrophenanthrene compound, having in 17-position the grouping

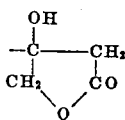

18. The Δ⁵ - 3 - acetoxy - 20:21-dihydroxy-norcholenic acid lactone of melting point 239° C. and of the formula:

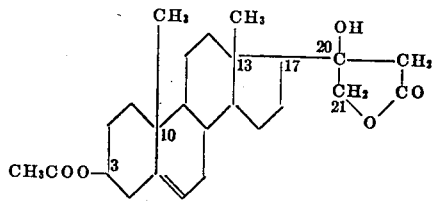

19. A compound of the formula

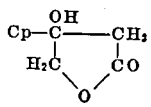

in which Cp is a cyclopentanopolyhydrophenanthrene radical.

20. A process for the manufacture of a lactone of the cyclopentanopolyhydrophenanthrene series, which comprises treating a compound of the said series having in 17-position the radical —COCH₂R, in which R is an esterified hydroxyl group, with an ester of an α-halogen fatty acid.

21. A process for the manufacture of a β-substituted β-hydroxy-γ-butyrolactone, which comprises reacting a ketone of the formula

R'—COCH₂R in which R' is an organic radical having a carbon atom directly attached to the —CO— carbon atom and in which R is an esterified hydroxyl group, with an ester of an α-halogen fatty acid.

22. The process recited in claim 20 and in which the product is subjected to water elimination to produce the corresponding unsaturated lactone.

23. The process recited in claim 21 and in which the product is subjected to water elimination to produce the corresponding unsaturated lactone.

24. A process for the manufacture of lactones of the saturated and unsaturated cyclopentanopolyhydrophenanthrene series, which comprises treating a compound of the said series having in 17-position the radical

—CO—CH₂—R in which R stands for a member of the group consisting of an esterified and etherified hydroxyl group, with a member of the group consisting of α- and β-halogen fatty acid esters, amides and nitriles, subjecting the condensation product to a process for eliminating water, and then to the action of hydrolyzing and lactonizing agents.

25. A process for the manufacture of lactones of the saturated and unsaturated cyclopentanopolyhydrophenanthrene series, which comprises treating a compound of the said series having in 17-position the radical

—CO—CH₂—R in which R stands for a member of the group consisting of an esterified and etherified hydroxyl group, with a member of the group consisting of α- and β-halogen fatty acid esters, amides and nitriles, and then to the action of hydrolyzing and lactonizing agents.

26. A process for the manufacture of lactones of the saturated and unsaturated cyclopentanopolyhydrophenanthrene series, which comprises treating a compound of the said series having in 17-position the radical

—CO—CH₂—R in which R stands for a member of the group consisting of an esterified and etherified hydroxyl group, with a member of the group consisting of α- and β-halogen fatty acid esters, amides and nitriles, subjecting the condensation product to the action of hydrolyzing and lactonizing agents and then to a process for eliminating water.

LEOPOLD RUZICKA.
TADEUS REICHSTEIN.